(12) United States Patent
Davies et al.

(10) Patent No.: US 8,550,503 B2
(45) Date of Patent: Oct. 8, 2013

(54) MICROFLUIDIC CONNECTOR

(75) Inventors: Mark Davies, Limerick (IE); Tara Dalton, Limerick (IE)

(73) Assignee: Stokes Bio Ltd., Limerick (IE)

( * ) Notice: Subject to any disclaimer, the term of this patent is extended or adjusted under 35 U.S.C. 154(b) by 633 days.

(21) Appl. No.: 12/443,303

(22) PCT Filed: Sep. 27, 2007

(86) PCT No.: PCT/IE2007/000088
§ 371 (c)(1),
(2), (4) Date: Dec. 23, 2009

(87) PCT Pub. No.: WO2008/038258
PCT Pub. Date: Apr. 3, 2008

(65) Prior Publication Data
US 2010/0109320 A1 May 6, 2010

Related U.S. Application Data

(60) Provisional application No. 60/847,683, filed on Sep. 28, 2006.

(51) Int. Cl.
*F16L 39/04* (2006.01)
(52) U.S. Cl.
USPC ......... 285/302; 285/124.3; 422/502; 422/546
(58) Field of Classification Search
USPC .............. 285/302, 124.3; 210/461, 460, 462; 422/502, 546
See application file for complete search history.

(56) References Cited

U.S. PATENT DOCUMENTS

| 327,281 A | * | 9/1885 | Letzkus | 285/302 |
| 943,904 A | * | 12/1909 | Struer | 285/302 |
| 1,159,845 A | * | 11/1915 | Kidd | 285/302 |
| 3,296,361 A | * | 1/1967 | Markland et al. | 285/302 |
| 3,451,483 A | * | 6/1969 | Elliott et al. | 285/302 |
| 3,752,505 A | * | 8/1973 | Stout | 285/302 |
| 4,453,954 A | * | 6/1984 | Kolb et al. | 285/133.11 |

(Continued)

FOREIGN PATENT DOCUMENTS

| WO | WO 98/20352 A | 5/1998 |
| WO | WO 98/33001 A | 7/1998 |
| WO | WO 03/016558 | 2/2003 |
| WO | WO-2008/038258 | 4/2008 |

OTHER PUBLICATIONS

PCT/US2011/030056, "International Search Report mailed Dec. 26, 2011", 3 Pgs.
PCT/US2011/030056, "Written Opinion mailed Dec. 26, 2011", 4 Pgs.

*Primary Examiner* — David E Bochna

(57) ABSTRACT

A microfluidic connector (1) comprises an enclosure (6, 7), a fluidic inlet port (2) and a fluidic outlet port (3), in the enclosure, in which the inlet and outlet ports (2, 3) are movable with respect to each other, for example, mutual spacing between the inlet and outlet ports (2, 3) is variable. A port (2) is in a fixed part (6) of the enclosure, and another port (3) is in a part (7) of the enclosure which slides with respect to the fixed part. There may be multiple inlet ports (22, 23) and/or multiple outlet ports (24, 25). Also, there may be an auxiliary port (45) for introduction of fluid into the enclosure (47, 48) or removal of fluid from the enclosure.

11 Claims, 9 Drawing Sheets

(56) References Cited

U.S. PATENT DOCUMENTS

| | | | |
|---|---|---|---|
| 4,558,173 A * | 12/1985 | Gajajiva et al. | 285/302 |
| 4,662,914 A * | 5/1987 | Hansen et al. | 96/106 |
| 5,207,109 A * | 5/1993 | Olsen | 73/863.73 |
| 5,270,183 A | 12/1993 | Corbett et al. | |
| 5,487,569 A * | 1/1996 | Silvis et al. | 285/131.1 |
| 5,601,785 A * | 2/1997 | Higdon | 285/382 |
| 5,720,923 A | 2/1998 | Haff et al. | |
| 5,772,259 A * | 6/1998 | Geary et al. | 285/302 |
| 5,779,977 A | 7/1998 | Haff et al. | |
| 5,827,480 A | 10/1998 | Haff et al. | |
| 6,033,880 A | 3/2000 | Haff et al. | |
| 6,095,572 A * | 8/2000 | Ford et al. | 285/361 |
| 7,229,594 B2 * | 6/2007 | Renaud et al. | 422/546 |
| 7,399,003 B2 * | 7/2008 | Kobayashi et al. | 285/124.3 |
| 7,472,928 B2 * | 1/2009 | Salven et al. | 285/124.3 |
| 7,601,286 B2 * | 10/2009 | Benett et al. | 264/221 |
| 7,802,923 B2 * | 9/2010 | Arnold et al. | 385/53 |
| 7,984,929 B2 * | 7/2011 | Gill | 285/124.3 |
| 8,021,056 B2 * | 9/2011 | Arnold et al. | 385/53 |
| 8,109,538 B2 * | 2/2012 | Helstern et al. | 285/239 |
| 2004/0017981 A1 * | 1/2004 | Jovanovich et al. | 385/68 |
| 2004/0022686 A1 | 2/2004 | Charles et al. | |
| 2006/0163143 A1 | 7/2006 | Chirica et al. | |
| 2007/0039866 A1 | 2/2007 | Schroeder et al. | |
| 2007/0062583 A1 | 3/2007 | Cox et al. | |
| 2007/0068573 A1 | 3/2007 | Cox et al. | |
| 2007/0141593 A1 | 6/2007 | Lee et al. | |
| 2008/0003142 A1 | 1/2008 | Link et al. | |
| 2010/0015606 A1 | 1/2010 | Davies et al. | |

* cited by examiner

MICROFLUIDIC CONNECTOR

This application is a US national phase of PCT/IE2007/00088, filed on Sep. 27, 2007 which claims priority to U.S. provisional application No. 60/847,683, filed on Sep. 28, 2006.

FIELD OF THE INVENTION

The invoice relates to a connector between fluidic conduits such as channels or tubes. The invention relates particularly to the microfluidic scale.

PRIOR ART DISCUSSION

A frequent requirement in microfluidics is to make a temporary but sound connection between two tubes or channels. Examples are, for instance, where a part with fluidic connections to other parts needs to be removed, may need to be disregarded because of contamination, or it may need to be refilled with reagents. Another example is when the connection between two or more tubes needs to be changed automatically, where for instance the contents of a well is delivered sequentially to many tubes.

It is known to provide a connector that is manually disconnected and reconnected. It is also known to use valves so that a fluidic line is closed and another opened to redirect the fluid flow.

The invention is directed towards providing an improved fluidic connector.

SUMMARY OF THE INVENTION

According to the invention, there is provided a microfluidic connector comprising an enclosure, a fluidic inlet port, and a fluidic outlet port in the enclosure, in which the inlet and outlet ports are movable with respect to each other.

In one embodiment, the mutual spacing between the inlet and outlet ports is variable.

In one embodiment, a port is in a fixed part of the enclosure, and another port is in a part of the enclosure which is movable with respect to said fixed part.

In one embodiment, the movable part slides within the fixed part.

In one embodiment, the connector comprises a plurality of inlet ports.

In one embodiment, the connector comprises a plurality of outlet ports.

In one embodiment, the connector further comprises an auxiliary port for introduction of fluid into the enclosure or removal of fluid from the enclosure.

In one embodiment, the inlet ports and/or the outlet ports extend through a movable support for changing mutual alignment of ports.

In one embodiment, the connector comprises a single inlet port and a plurality of outlet ports, the enclosure being configured as a manifold.

In one embodiment, the connector comprises a single outlet port and a plurality of inlet ports, the enclosure being configured as a mixer.

In one embodiment, the enclosure is an inner enclosure mounted within an outer enclosure.

In one embodiment, there is a port in the inner enclosure for flow of fluid between the inner enclosure and the outer enclosure.

In one embodiment, the outer enclosure has an outlet port.

In one embodiment, there are a plurality of inner enclosures within the outer enclosure.

In another aspect, the invention provides a method of controlling fluidic flow through any connector defined above, the method comprising the steps of directing flow of a carrier fluid carrying discrete plugs or droplets of a different fluid so that the plugs or droplets transfer from the inlet port to the outlet port.

Detailed Description Of The Invention

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

In a microfluidic system, a liquid bridge forms a connection between inlet and outlet ports. This works in a two or more phase flow where one of the phases is attached to the end of the inlet and outlet ports and therefore can be made to bridge between these ports, with the boundaries of these bridges defined by the region of interfacial tension between the two phases. By this means a solid connection between two tubes is replaced by a liquid one. The connection may therefore be broken and remade without effort for many connections, many times.

The following are aspects and advantages:

The connector does not bring the connecting channels or tubes into contact but instead immerses them in a fluid well.

It allows a two phase fluid to flow across a junction with the second phase in droplets bridging across the junction.

There may be many inlets and outlets with each inlet connecting with an outlet so that for a multiple phase inlet multiple bridges will be formed. In this arrangement there may be a fluid flow into a fluid bath so that a single aqueous phase at inlet will be segmented at exit. Also, there may be fluid flow from the bath so that the aqueous phase droplets can mix. In addition the inlet ports may be moved relative to the outlet ports so that a variety of inlet/outlet combinations can be formed.

There may be fewer inlets than outlets and the inlet bridges the outlet when the aqueous phase is present at the bridge, forming a manifold that distributes the aqueous phase between the outlets. With the addition of an out of plane tube or channel this fluidic connector can be converted into a segmenter.

There may be fewer outlets than inlets and the inlet bridges the outlet when the aqueous phase is present at the bridge, forming a mixer that combines the phases entering from the inlets into a single mixed phase exiting through the outlet. With the addition of an out-of-plane tube or channel this fluidic connector can be converted into a segmenter.

There may be one or more fluidic connectors contained in an immiscible fluid so as to eliminate the problem of leakage from the connector to the surroundings.

There may be an array of fluidic bridges with a common outlet port, and where each bridge does not need to be sealed from each other. In this aspect the fluidic bridges may be replaced by means of a lattice of tubes.

Figure 1:
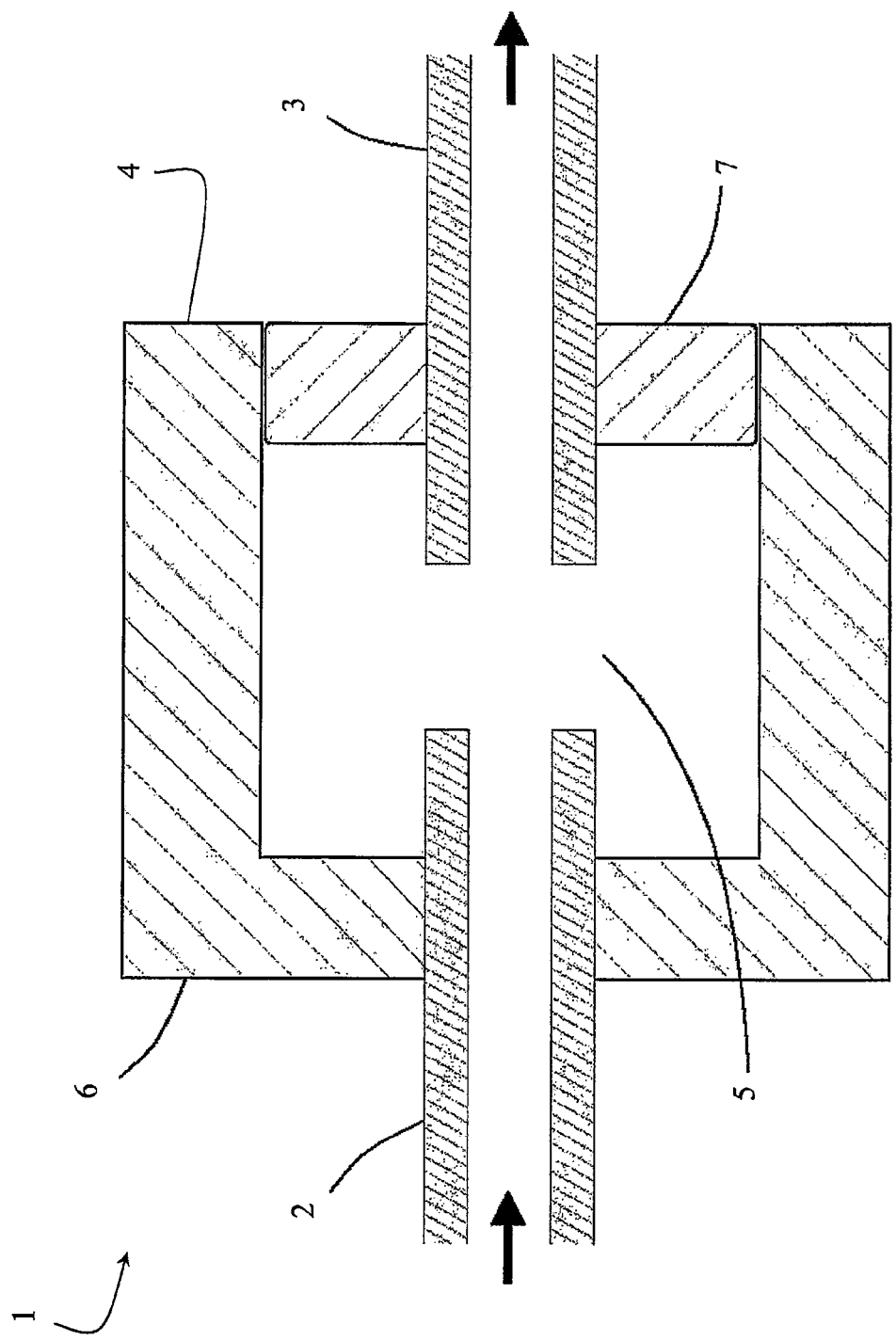
FIG. 1 is a cross-sectional diagram of a fluidic connector of the invention.

FIG. 1 shows a connector 1 fluidically joining a tube 2 to a tube 3 across a bath 4 of fluid 5. Two parts 6 and 7 are attached to the tubes 2 and 3 respectively, and are sealed. Part 7 can be removed from part 6, making the device a reusable connector.

Figure 2:
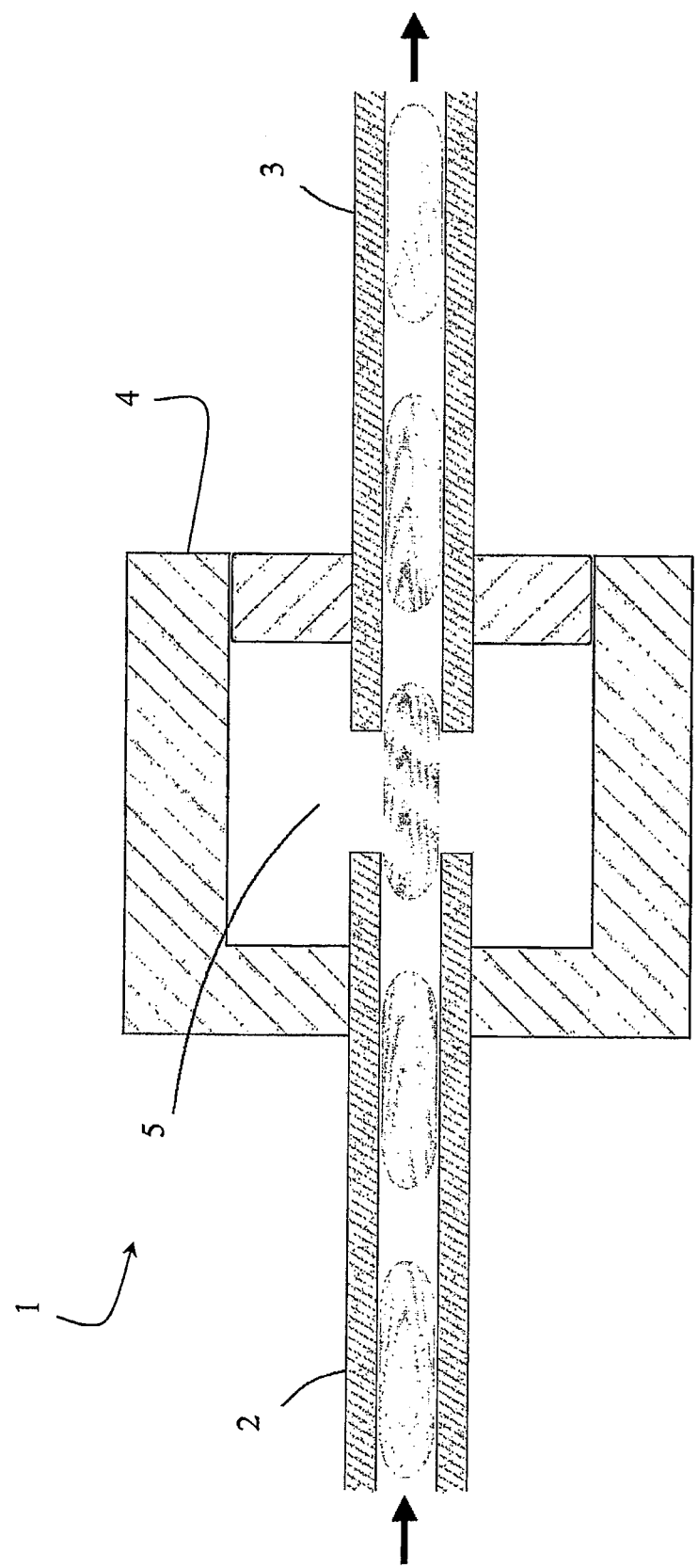
FIG. 2 is a cross-sectional diagram of the connector in use as a two-phase inlet and outlet across a liquid bridge.

For single phase fluid connections, of either a gas or a liquid, the tubes and bath are continuously filled with that fluid. For a two-phase liquid flow, where one phase is in the form of plugs or droplets separated by the second immiscible phase, one phase continuously fills the bath and the second phase periodically bridges the ends of tubes 2 and 3, as shown in FIG. 2. The connector 1 may also be configured such that an immiscible phase fills the bath 4 and a second phase flows continuously from 2 to 3 across a permanent liquid bridge.

Figure 3:
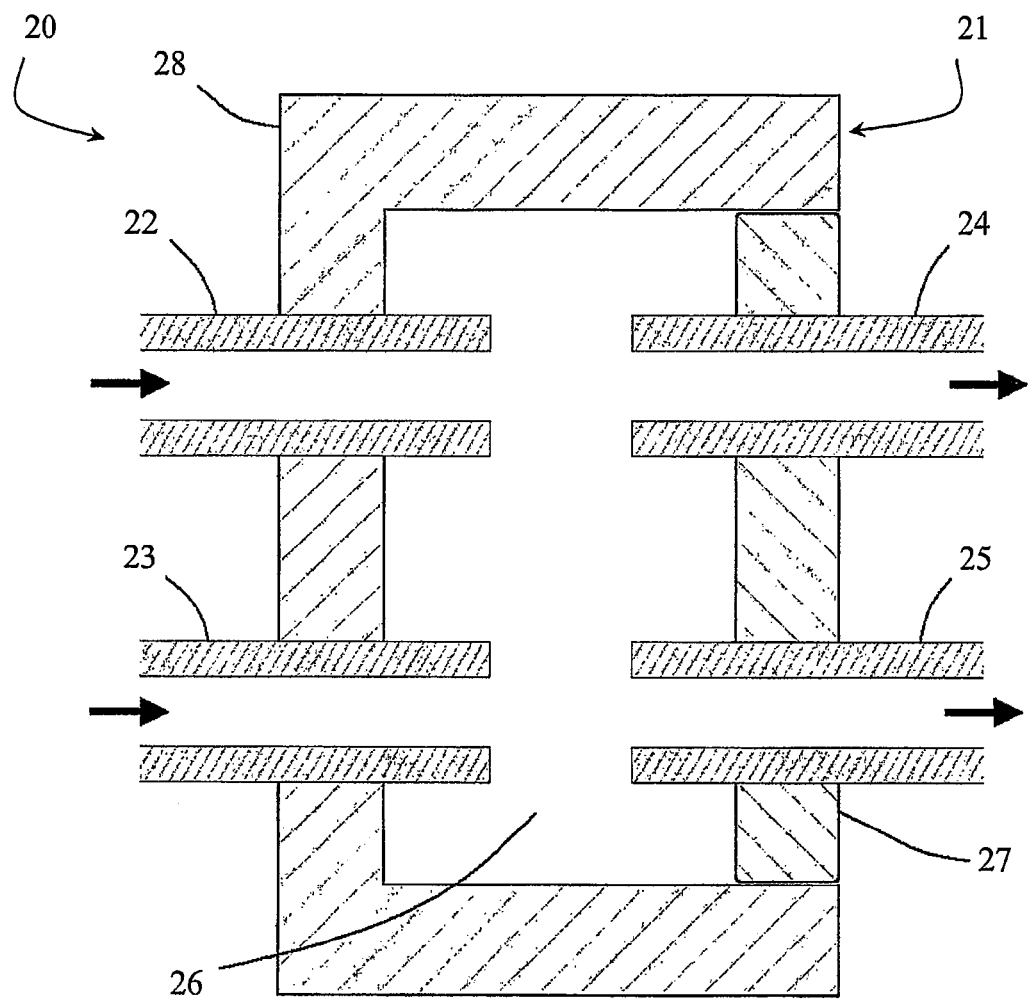
FIG. 3 is a cross-sectional diagram of a connector with two inlets and outlets.

FIG. 3 shows multiple inlets and outlets configured in a connector 20, in which two are shown. A connector 20 has a bath 21, two inlets 22 and 23, and two outlets 24 and 25. The bath 21 is composed of two parts, 27 and 28.

The connector 20 may be used as follows:
(1) The same fluid fills tubes 22, 23, 24 and 25 and the bath 21. Here, an advantage is that very many connections can be made by simply connecting 27 to 28 and the connections may be made and remade many times without damage to the tubes.
(2) A two-phase fluid flows in and out of the ports in the same manner as described with reference to FIG. 2. The same advantage given in (1) above applies.
(3) A different fluid flows in at 22 and 23 and out at 24 and 25 respectively with the bath 21 filled with an immiscible liquid. There is thereby no cross contamination between the streams. The same advantage given in (1) above applies.

Figure 4:
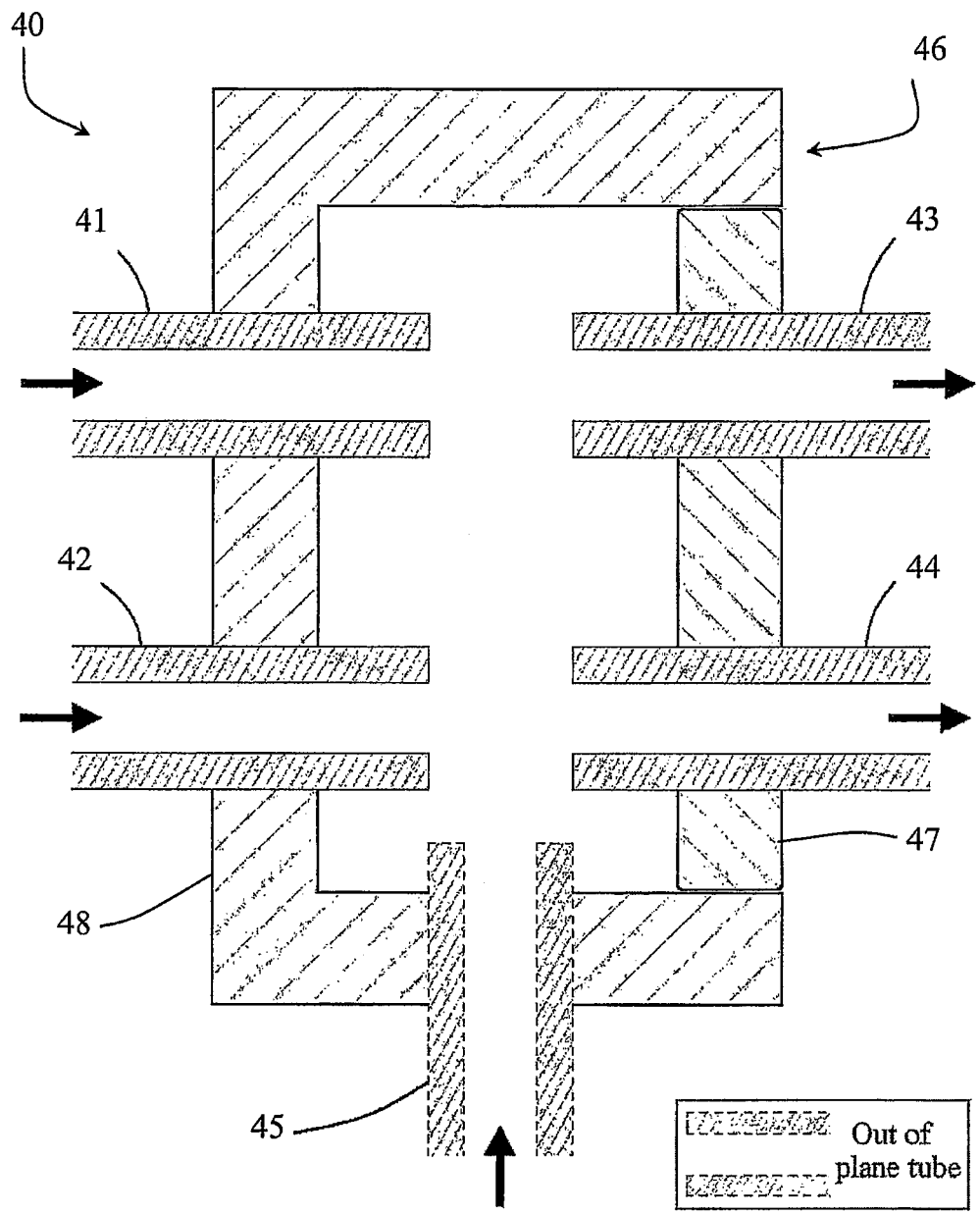
FIG. 4 is a cross-sectional diagram of a connector with a flowing bath liquid.

FIG. 4 shows a connector 40 having two inlets 41 and 42, two outlets 43 and 44, an auxiliary port 45, and parts 47 and 48 of the bath 46. In this diagram only two inlets and two outlets are shown however multiple inlets and outlets may be used. It has the same configuration as that of FIG. 3 but with the addition of the port 45 to allow flow into or out of the bath. When flow is taken from the port 45, two phase flows at the inlets 41 and 42, in the form of plugs or droplets can be merged in the bath and delivered either as a continuous phase from the ports 43 and 44, or as two phases, but with the most closely spaced droplets or plugs mixed into one. The connector may therefore also be used to mix two fluids. When flow is fed in at 45, if the flow rates are correctly matched, a continuous phase at ports 41 and 42 can be segmented into droplets or plugs for delivery at outlet ports 43 and 44.

The ports can be arranged in various embodiments in lines opposite each other or in a cylinder with the tubes running axially, or in any geometrical configuration which allows for the ends of tubes to be arranged on the same axis. The tubes at inlet and outlet can also be of any internal and external diameter to facilitate the bridging. With regard to FIG. 4, the most common requirement would be for all inlet and outlet ports to operate under the same conditions. The flow into port 45 would therefore need to be suitably distributed so that it is divided equally between the ports that it delivers to, or takes from. The fluidic bridge connections are somewhat forgiving of misalignment of the axis of the bridge inlet and outlet tubes.

Figure 5:
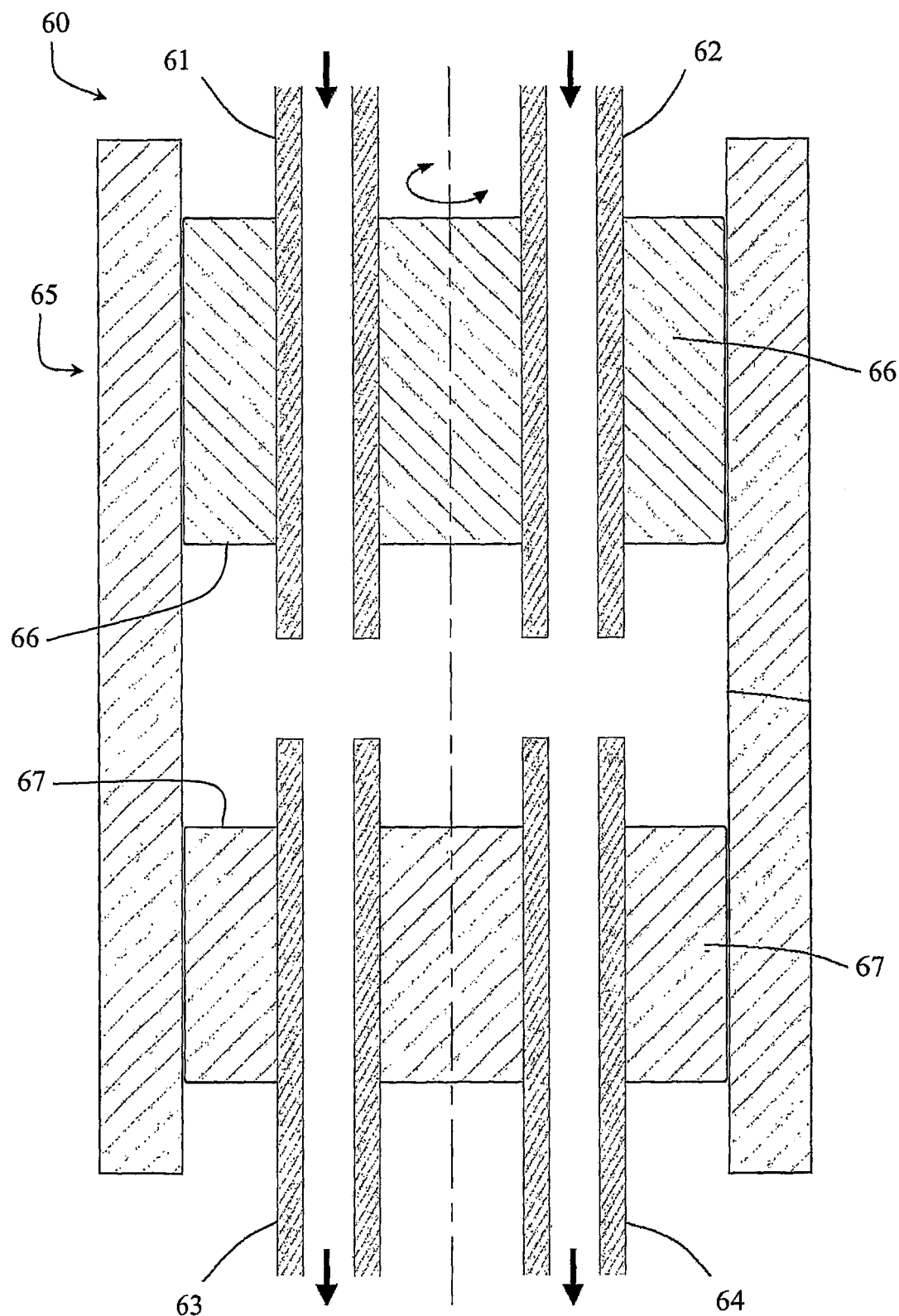
FIG. 5 is a cross-sectional diagram of a fluidic connector in which the connection may be changed by moving one set of ports relative to the others.

FIG. 5 shows a connector 60 having inlet ports 61 and 62, outlet ports 63 and 64, and a bath 65 defined between moveable supports 66 and 67. Parts 65 and 67 may exist as one part where only part 6 is moveable. The connections between ports may be changed by simply moving one set of ports relative to another so as to line up different inlets with different outlets in the bath. The two inlet ports 61 and 62 are shown with corresponding outlet ports 63 and 64. By rotating part 66 relative to 67. The connections may be changed between 61-63 and 62-64 to 61-64 and 62-63. This may be done many times for many connections. Turning on an axis is only one method of achieving relative movement of ports. Part 66 may be driven by an orthogonally orientated stepper motor, hydraulic drives or pneumatic drives so that any inlet port maybe positioned adjacent to any outlet port. The transition is best completed in a two phase flow, where the phase in the bath is passed between ports during the transition and the bridging phase is transmitted when the support 66 is stationery relative to support 67. By this means fast, reliable, repeatable and near zero maintenance connections may be made for many inlet and outlet ports.

Figure 6:
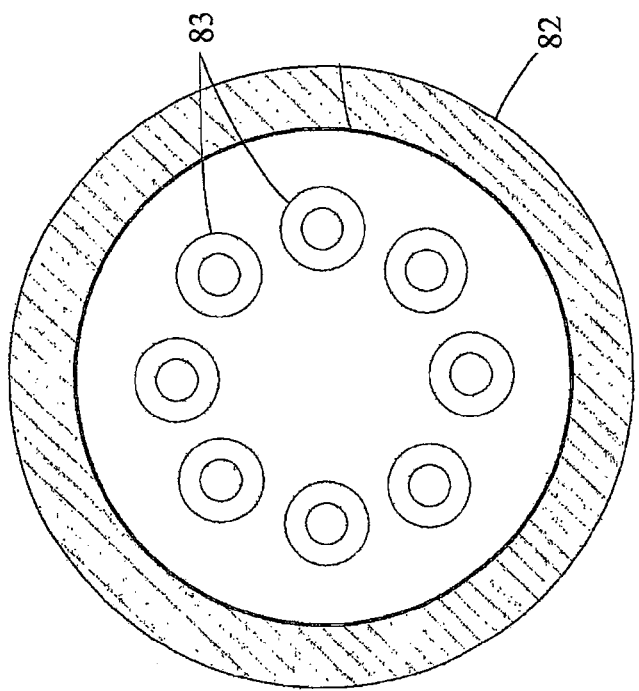
FIG. 6 is a cross-sectional diagram and an end view of a fluidic connector which acts as a manifold by connecting multiple outlet ports to a single inlet port.
Figure 6:
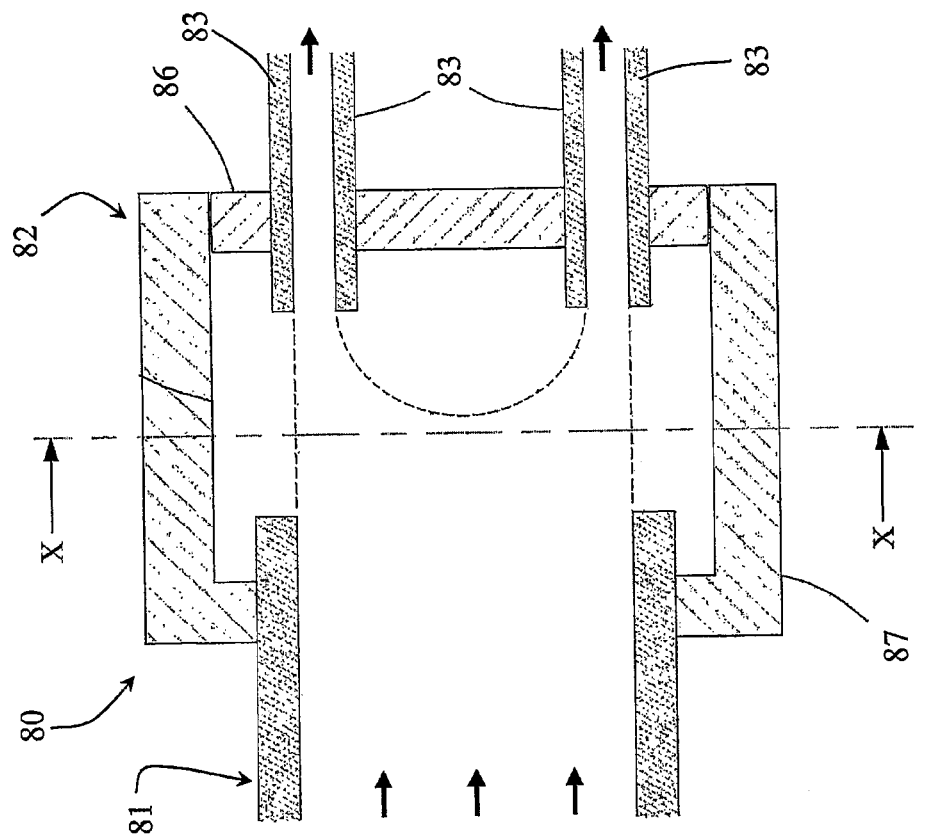

FIG. 6 shows a connector 80 having a single inlet port 81, a bath 82 with enclosure parts 86 and 87, and multiple outlet ports 83. An inlet port can be used to feed equal flow to multiple outlets. The inlet port 81 is centred with the outlet ports 83 circumferentially positioned at equidistance from each other. When fluid flows from the inlet, the aqueous phase bridges with all multiple outlet ports simultaneously. The outlet flow in each tube is equal with the connector acting as a manifold. With the addition of an out-of-plane tube or channel of fluid flow into the bath this fluidic connector can be converted into a segmenter.

Also, if the flow through the system is reversed with the existence of one outlet port with many inlets, the fluidic connector becomes a mixer where multiple phases entering simultaneously through the inlets bridge with the single outlet and thus create one single phase. Again, with the addition of an out of plane tube or channel of fluid flow into the bath this fluidic connector can be converted into a segmenter.

Figure 7:
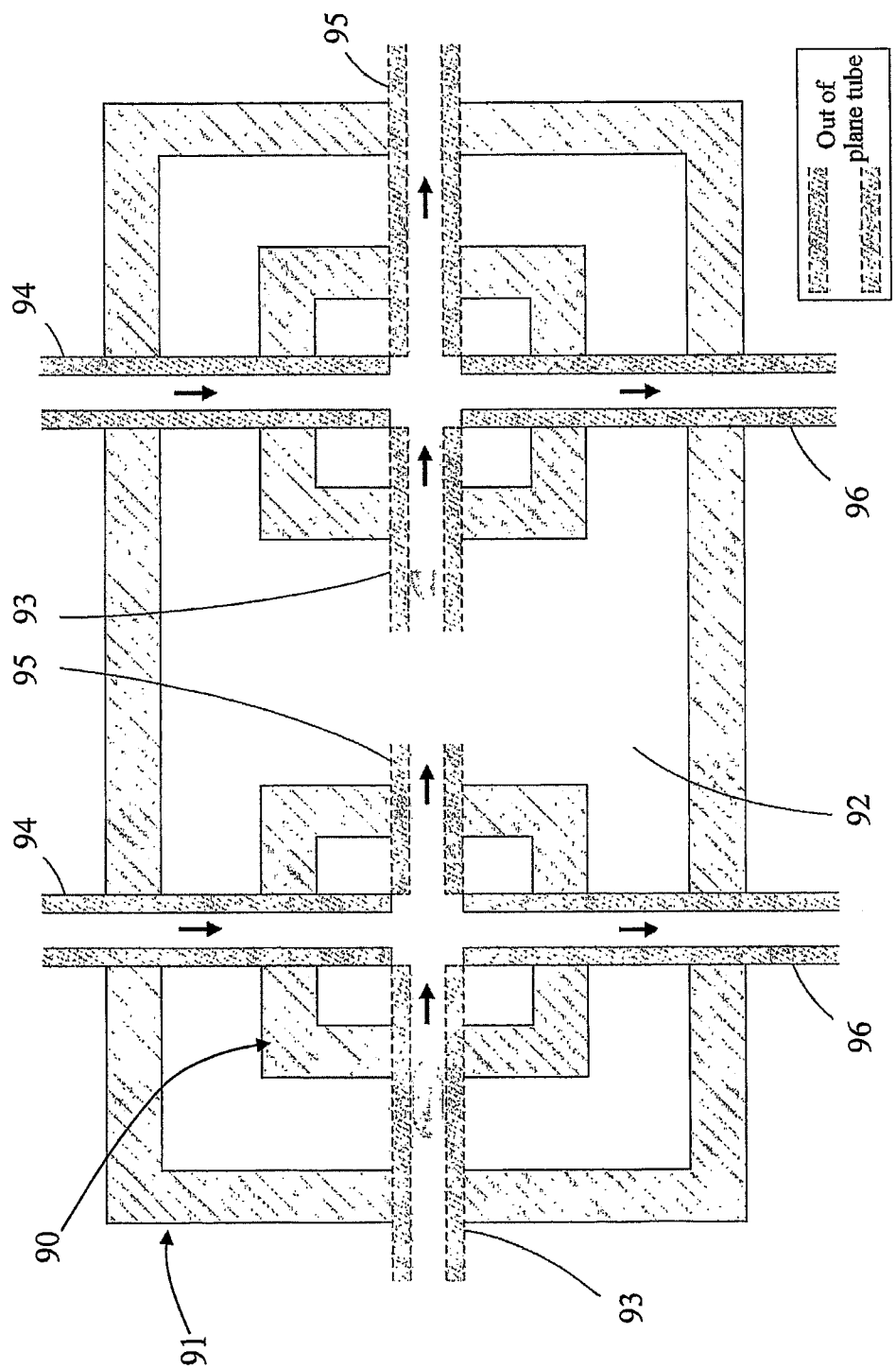
FIG. 7 is a cross-sectional diagram of fluidic connectors in a bath of immiscible fluid.

As illustrated in FIG. 7 the fluidic connectors 90 can also sit in a bath 91 of immiscible fluid. Two bridges are shown in the diagram however any number of fluidic connectors can be used. The bridges have two inlet tubes or channels 93 and 94 entering into the bath and join with the fluidic connector while two outlet tubes or channels 95 and 96 extend out from the bridge and out of the bath. In this embodiment instead of the bridges being set in a solid material they are in a bath of the same immiscible fluid as used in the bridges. There is then no need to be concerned about sealing the bridge tubes. This overcomes the problem of ensuring that no liquid will leak from the bridge.

Figure 8:
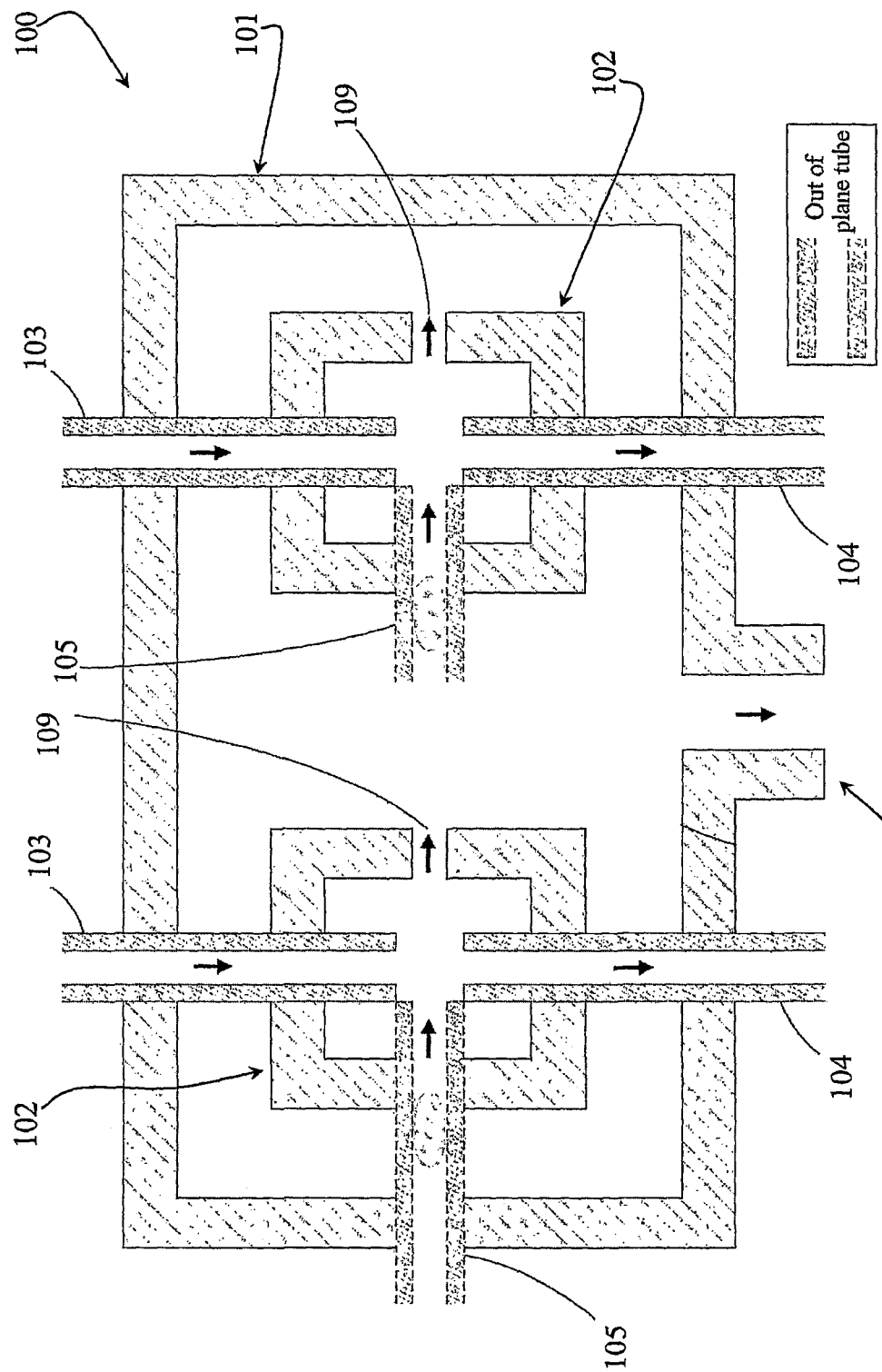
FIG. 8 is a cross-sectional diagram of a fluidic bath containing an array of fluidic bridges with a common outlet port and in which the bridges do not need to be sealed from each other.

FIG. 8 shows a connector 100 having a main bath 101 within which are two baths 102, each having an inlet port 103, an outlet port 104, and an auxiliary inlet port 105. In this embodiment only two bridges are shown, for illustration.

Instead of connecting outlet ports 109 to a separate withdrawal system, the withdrawal is to a common reservoir from which fluid is withdrawn from the one port 110. Only the immiscible fluid is drawn from the ports 109 while aqueous phase arriving at either of the inlet ports 103 and 105 exits to the lower outlet ports 104. Because of this the bridges can all be fully immersed and sealed in a bath of the immiscible fluid, but they do not need to be sealed from each other, making their manufacture and assembly considerably easier.

Figure 9:
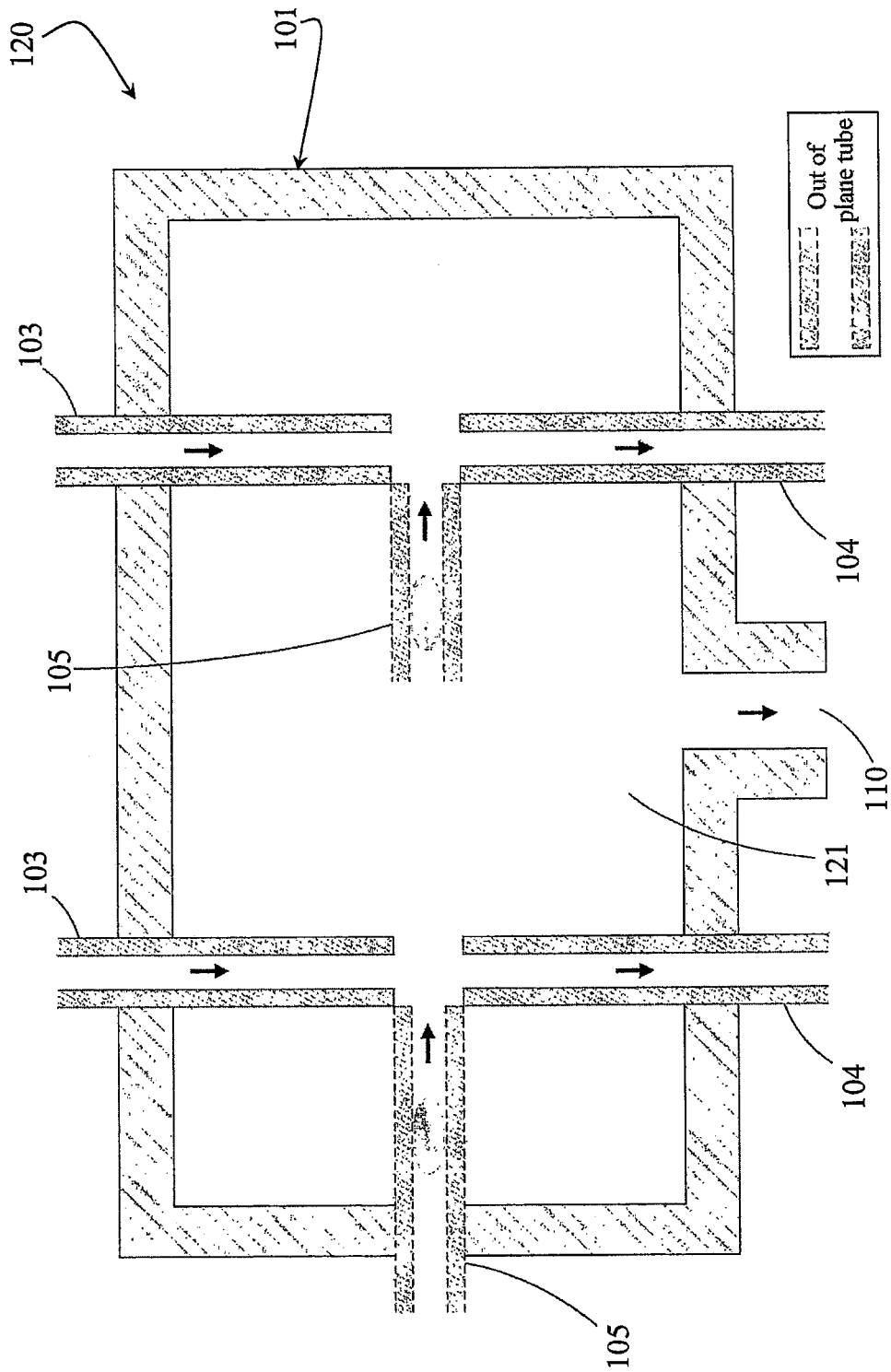
FIG. 9 is a cross-sectional diagram of a fluidic bath containing a lattice of tubes arranged as fluidic bridges with a common outlet port.

The potential for further simplification is shown in FIG. 9, in which like parts have the same reference numerals. Here, the structure of the withdrawal bridges is removed to leave only a lattice of tubes in a bath of oil phase (2). Internal structures, not shown, are only important here to support the two inlets 103 and 105 and one outlet port 104 for each bridge. The outlet port 110 is configured and positioned so that the withdrawn flow rate is the same for each of the constituent bridges. The network of bridges may be repeated many times and may be constructed at very small length scales (>10 μm), to form a compact microfluidic circuit. If the problem of equal extraction of the immiscible fluid from the outlet ports 104 is difficult to solve then individual ports, local to each bridge, can be used to extract the immiscible fluid from the reservoir.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. It will be appreciated that the invention provides excellent versatility in bridging of microfluidic flows. The mutual positions of the ports may be changed to optimum positions according to fluidic characteristics and desired outlet flow parameters. For example, there may be adjustment to provide a desired droplet size in outlet flow.

The invention is not limited to the embodiments described but may be varied in construction and detail.

The invention claimed is:

1. A fluidic connector comprising
an enclosure comprising a fixed part and a movable part, wherein the enclosure includes a first fluid, the enclosure is enclosed within an outer enclosure, and wherein there is a port in the enclosure for flow of fluid between the enclosure and outer enclosure;
a fluidic inlet port, located within the fixed part, for introducing a second fluid, wherein the second fluid is immiscible with the first fluid; and
a fluidic outlet port located within the movable part,
wherein the fluidic inlet port and the fluidic outlet port are not physically connected and wherein the fluidic inlet port and the fluidic outlet port are in fluidic communication with the enclosure.

2. The fluidic connector of claim 1, wherein the mutual spacing between the inlet and outlet ports is variable.

3. The fluidic connector of claim 1, wherein the movable part slides within the fixed part.

4. The fluidic connector of claim 1, wherein the connector comprises a plurality of inlet ports.

5. The fluidic connector of claim 1, wherein the connector comprises a plurality of outlet ports.

6. The fluidic connector of claim 1 further comprising an auxiliary port for the introduction of fluid into the enclosure or removal of fluid from the enclosure.

7. The fluidic connector of claim 1, wherein the connector comprises a single inlet port and a plurality of outlet ports, the enclosure being configured as a manifold.

8. The fluidic connector of claim 1, wherein the connector comprises a single outlet port and a plurality of inlet ports, the enclosure being configured as a mixer.

9. The fluidic connector of claim 1, wherein the outer enclosure has an outlet port.

10. The fluidic connector of claim 1, wherein there are a plurality of enclosures within the outer enclosure.

11. A method of controlling fluidic flow through the connector of claim 1, the method comprising the steps of directing flow of a carrier fluid carrying discrete plugs or droplets of a different fluid so that the plugs or droplets transfer from the inlet port to the outlet port.

* * * * *

UNITED STATES PATENT AND TRADEMARK OFFICE
CERTIFICATE OF CORRECTION

PATENT NO.       : 8,550,503 B2                                       Page 1 of 1
APPLICATION NO.  : 12/443303
DATED            : October 8, 2013
INVENTOR(S)      : Davies et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this
Fifteenth Day of September, 2015

Michelle K. Lee
*Director of the United States Patent and Trademark Office*